L. Wilkinson,
Bending Axletrees.
Nº 59,934. Patented Nov. 20, 1866.

Witnesses:  
Wm F Noyes.  
R. Fitzgerald.

Inventor:  
Levi Wilkinson.

United States Patent Office.

IMPROVED SCREW-CLAMP FOR BENDING AXLE-TREES.

LEVI WILKINSON, OF NEW HAVEN, CONNECTICUT.

Letters Patent No. 59,934, dated November 20, 1866.

SPECIFICATION.

TO ALL WHOM IT MAY CONCERN:

Be it known that I, LEVI WILKINSON, of the city and county of New Haven, and State of Connecticut, have invented a new and useful improvement in Screw-Clamps, or Apparatus for Setting or Adjusting Carriage Axle-Trees; and I do hereby declare that the following is a full, clear, and exact description of the construction, character, and operation of the same, reference being had to the accompanying drawings which make part of this specification, in which—

Figure 1:
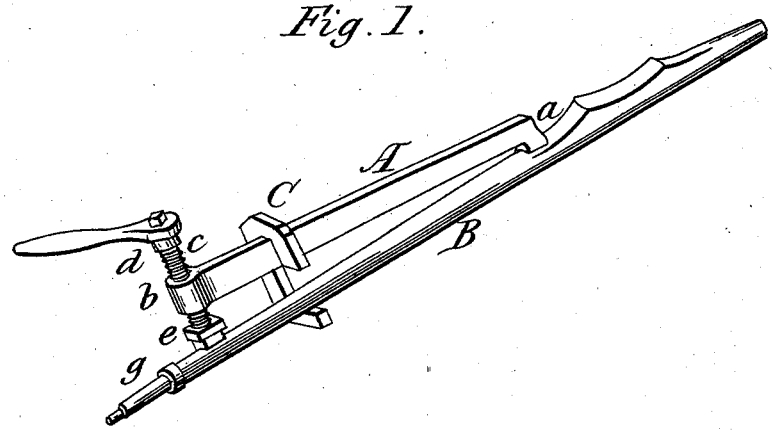
Figure 1 is a perspective view of the whole apparatus as it will appear when in use, or in the operation of bending or adjusting the axle-tree.
Figure 2:
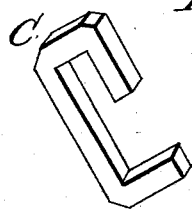
Figure 2 is a perspective view of the loop or movable part of the clamp, showing the general form.

My improvement consists in the use of an inflexible bar, with one (the stationary) end fitted to rest upon or against the axle-tree, and with a female screw or thread cut or tapped in the other (or vibrating) end; and in the use of a male screw, (to work in the female thread in the bar,) with a suitable support to rest on or against the axle-tree, and a suitable wrench or lever to turn it; and an adjustable clamp or hook to slide on the bar and hook on to or over the axle-tree at the joint or place where I desire to bend the axle-tree for the purpose of increasing or lessening the curve, so as to cause the wheels to run true, or to "track" in a proper manner. I make the inflexible bar, A, of iron, or any other suitable material; substantially in the form or shape represented in fig. 1; that is, I make its greatest latter dimension in the direction of the strain, and one (the stationary) end fitted to rest upon or against the axle-tree, (a portion of one being represented at B,) as represented at $a$; and in the other (the vibrating) end I cut or tap a female screw, as indicated at $b$, to receive the male screw, $c$, all as represented in fig. 1. I make the male screw, $c$, of iron, or any other suitable material, with a proper head to receive a suitable wrench or lever, as represented at $d$, or in any other convenient form, to enable me to turn the screw, $c$, with sufficient force; and on the other end or point of the screw I fit a proper block or bearing, $e$, to rest against the axle, all as shown in fig. 1. I make the clamp or hook, C, of iron, or any other suitable material, in the form or shape shown in fig. 2, or of any other convenient shape, so that it may be adjusted on the bar, A, and hooked on to the axle-tree, as seen in fig. 1, or otherwise. Having made the parts and fitted the screw, as before described, when I desire to adjust an axle-tree which has been sprung by over-loading, collision, or otherwise, I slip the hook or clamp C on to the bar A, and hook it on to the axle B, place the stationary end $a$ on or against the axle-tree, and rest the block or bearing $e$ on or against the axle-tree near the collar $g$, adjust the clamp, or hook, C, to the required point or position on the axle-tree, and turn the screw, $c$, until the axle-tree is bent to the proper degree to perfect the adjustment; all which may, in most cases, be done without removing either the wheels or the body from the axle-tree, and even without detaching the horses from the carriage.

What I claim as my invention, and desire to secure by Letters Patent, is—

The combination of the bar (A,) and screw ($c$,) with the clamp, or hook (C,) when the whole is constructed, arranged, and fitted to produce the result, substantially as herein described and set forth.

LEVI WILKINSON.

Witnesses:
WM. F. NOYES,
R. FITZGERALD.